United States Patent
Archey et al.

[11] Patent Number: 5,821,321
[45] Date of Patent: Oct. 13, 1998

[54] MOLDING COMPOSITION HAVING IMPROVED IMPACT STRENGTH

[75] Inventors: Rick L. Archey, Pleasant Hills; James P. Mason, McKees Rocks; Leslie J. Vescio, Ambridge, all of Pa.

[73] Assignee: Bayer Corporation, Pittsburgh, Pa.

[21] Appl. No.: 931,850

[22] Filed: Sep. 16, 1997

[51] Int. Cl.$^6$ .................................................. C08G 64/00
[52] U.S. Cl. .............................. 528/196; 528/29; 528/43
[58] Field of Search .............................. 528/196, 21, 26, 528/29, 43

[56] References Cited

U.S. PATENT DOCUMENTS

| | | | |
|---|---|---|---|
| 3,189,662 | 6/1965 | Vaughn, Jr. ............................. | 260/824 |
| 3,419,634 | 12/1968 | Vaughn, Jr. ............................. | 260/824 |
| 4,123,588 | 10/1978 | Molari, Jr. ............................. | 428/412 |
| 4,569,970 | 2/1986 | Paul et al. .................................. | 525/67 |
| 4,657,989 | 4/1987 | Evans ........................................ | 525/464 |
| 4,920,183 | 4/1990 | Evans et al. ............................. | 525/464 |
| 4,994,532 | 2/1991 | Hawkins et al. ......................... | 525/464 |
| 5,068,302 | 11/1991 | Horlacher et al. ........................ | 528/21 |
| 5,414,054 | 5/1995 | Jonsson et al. ........................... | 525/439 |

*Primary Examiner*—Terressa Mosley
*Attorney, Agent, or Firm*—Joseph C. Gil; Aron Preis

[57] ABSTRACT

A thermoplastic molding composition having improved impact strength and a process for its preparation are disclosed. The structure of the resinous component of the composition contains carbonate structural units, polyester structural units and lactone-siloxane structural units conforming to

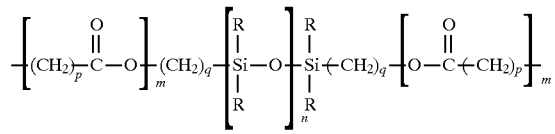

wherein m is 1 to 90, n is 5 to 300, R is an alkyl or a phenyl radical, p is 2 to 12 and q is 2 to 20. The preparation of the resinous component entails reactive blending in the presence of a transesterification catalyst of polycarbonate, (co) polyester and a lactone siloxane copolymer.

10 Claims, No Drawings

MOLDING COMPOSITION HAVING IMPROVED IMPACT STRENGTH

FIELD OF THE INVENTION

The invention concerns a thermoplastic molding composition and more particularly a composition the resinous component of which contains carbonate, ester and caprolactone-co-siloxane structural units.

SUMMARY OF THE INVENTION

A thermoplastic molding composition having improved impact strength and a process for its preparation are disclosed. The structure of the resinous component of the composition contains (i) units of the formula

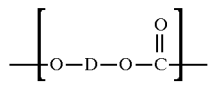

wherein D is a divalent residue of a dihydroxy compound, and
(ii) units of the formula

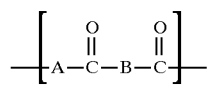

wherein A is a residue of an aliphatic glycol and B is a residue of an aromatic aliphatic or alicyclic acid
and
(iii) units of the formula

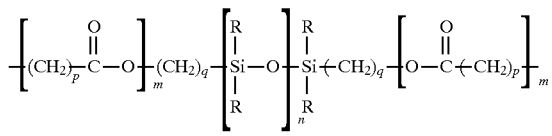

wherein m is 1 to 90, n is 5 to 300, R is an alkyl or a phenyl radical, p is 2 to 12 and q is 2 to 20. The preparation of the resinous component entails reactive blending of polycarbonate, (co)polyester and a suitable lactone siloxane copolymer in the presence of a catalyst.

BACKGROUND OF THE INVENTION

Polycarbonate resins are well-known thermoplastic resins which have long been used in a variety of applications requiring resistance to impact. At low temperatures, generally lower than 20° C., polycarbonate becomes brittle and its utility is thus limited by this shortcoming. It is known that the low temperature impact strength of polycarbonate may be improved upon by the introduction (by copolymerization) of silicone blocks into the carbonate structure. U.S. Pat. Nos. 3,189,662; 3,419,634; 4,123,588; 4,569,970; 4,920,183 and 5,068,302 are noted to disclose relevant copolymers.

Relevant copolymers have been prepared in accordance with a melt blending process disclosed in U.S. Pat. No. 4,994,532. The process entails melt blending an aromatic polycarbonate resin and a poly-diorganosiloxane having at least one functional carboxylic acid group. Also relevant in the present context is U.S. Pat. No. 4,657,989 which disclosed a preparation method where siloxane compound is reacted with polycarbonate, wherein at least one of the reactants is anionic and the other being reactive with nucleophiles.

Most relevant is the disclosure in U.S. Pat. No. 5,414,054 which disclosed reactive blending of polycarbonate with a lactone siloxane copolymer in the presence of a catalyst. The resulting compositions exhibit improved low-temperature impact strength.

DETAILED DESCRIPTION OF THE INVENTION

The inventive resin contains:
(i) structural units of the formula

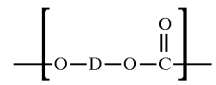

wherein D is a divalent residue of a dihydroxy compound (residue in the present context refers to the structure of the compound less its hydroxy groups) and
(ii) structural units of the formula

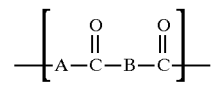

and
(iii) structural units of the formula

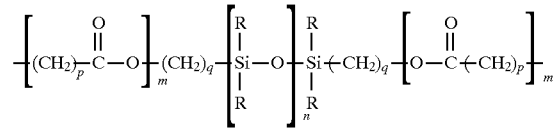

wherein m is 1 to 90, n is 5 to 300, R is an alkyl or a phenyl radical, p is 2 to 12 and q is 2 to 20.

The preparation of the resinous copolymer of the invention entails reactive blending of a polycarbonate resin, a suitable polyester and a lactone-siloxane block copolymer in the presence of a suitable catalyst.

The term "reactive blending" as used in the present context refers to a homogeneous admixing of the polycarbonate resin, the polyester and the lactone-siloxane block copolymer in the molten state, that is in the state where these resins are in a thermoplastic state-heated to a condition of plasticity whereupon the resins flow like a fluid. Typically, the temperature is within a range to cause reaction between the resins, generally in the range of 200° to 350° C., preferably 250° to 320° C.

Suitable polycarbonate resins for preparing the copolymer of the present invention are homopolycarbonates and copolycarbonates and mixtures thereof.

The polycarbonates generally have a weight average molecular weight of 10,000 to 200,000, preferably 20,000 to 80,000 and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

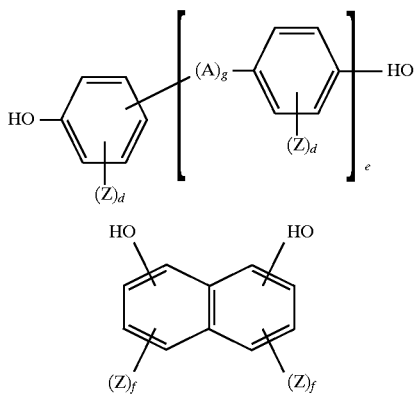

(1)

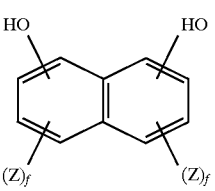

(2)

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

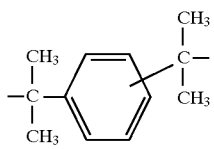

e and g both denote the number 0 to 1;

Z denotes F, Cl, Br or C$_1$–C$_4$-alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes, as well as their nuclear-alkylated compounds. These and further suitable aromatic dihydroxy compounds are described, for example, in U.S. Pat. Nos. 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl4-hydroxyphenyl)-propane, 2,2-bis-(3-chloro4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxybenzophenone, 2,4-bis-(3,5-dimethyl4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mol % (relative to the bisphenols) of polyhydroxyl compounds.

Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)4-methylphenol; 2,4-dihydroxybenzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pa.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556; 4,260,731; 4,369,303 and 4,714,746 all of which are incorporated by reference herein.

The (co)polyester suitable in the present invention comprise repeat units conforming to

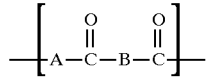

These are derived from at least one C$_{6-20}$-aromatic, C$_{3-20}$-aliphatic or alicyclic dicarboxylic acid, and at least one C$_{2-20}$-aliphatic glycol. Examples of the dicarboxylic acids include malonic, succinic, glutaric, adipic, pimelic, suberic, azelaic, sebacic, dodecanedioic, 1,4-, 1,5- and 2,6-decahydronaphthalene dicarboxylic acid, and cis- or trans-1,4-cyclohexane dicarboxylic acid. Examples of useful aromatic dicarboxylic acid are terephthalic acid; isophthalic acid; 4,4'-biphenyl-dicarboxylic acid; trans 3,3'- and trans 4,4'-stilbenedicarboxylic acid, 4,4'-dibenyidicarboxylic acid; 1,4-, 1,5'-, 2,3'-, 2,6-, and 2,7-naphthalenedicarboxylic acid. The preferred dicarboxylic acids are terephthalic and isophthalic acid or mixtures thereof.

The preferred glycol of the (co)polyester includes 2 to 8 carbon atoms. Examples include ethylene glycol, 1,2-propylene glycol, 1,3-propanediol, 1,4-butanediol, 1,5-pentanediol, 1,6-hexanediol, 1,2-, 1,3- and 1,4-cyclohexanedimethanol, neopentyl glycol, and 2,2,4,4-tetramethyl-1,3-cyclobutanediol. The preferred diols are 1,4-cyclohexanedimethanol, ethylene glycol and mixtures thereof.

The preferred (co)polyesters include resins having repeat units from poly(ethylene terephthalate) or poly(1,4-cyclohexylenedimethylene terephthalate). Preferred (co) polyesters comprise repeat units from terephthalic acid, isophthalic acid or mixtures thereof and 1,4-cyclohexanedimethanol. Other preferred (co)polyesters comprise repeat units from terephthalic acid and 1,4-cyclohexanedimethanol, ethylene glycol or mixtures thereof.

The preparation of the (co)polyesters follow conventional procedures well known in the art such as the process described in U.S. Pat. No. 2,901,466 which disclosure is incorporated herein by reference. The (co)polyesters of the invention have as a rule inherent viscosity of about 0.4 to 1.0 dl/g, preferably about 0.6 to 0.8 dl/g at 25° C. in a solvent containing 60 w/% phenol and 40 w/% tetrachloroethane.

The lactone-siloxane block copolymer suitable in the present context is preferably a block copolymer having a structure conforming to where m is 1 to 90, preferably 1 to 50, n is 5 to 300, preferably 10 to 160,

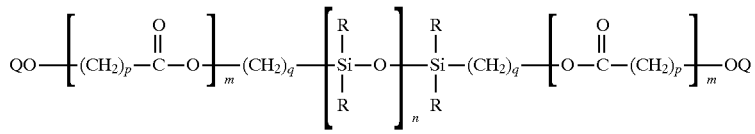

R denotes a substituted or an unsubstituted $C_1$–$C_{20}$-alkyl or a phenyl radical, preferably methyl, Q denotes H, $C_1$–$C_4$-alkyl or a substituted alkyl group, a hydrocyclic or substituted hydrocyclic group, an aromatic or substituted aromatic group, a benzylic or substituted benzylic group or a silyl or substituted silyl group, p is 2 to 12, preferably 2, 4 or 5, and q is 2 to 20, preferably 6 to 10.

In preparing the copolymer of the present invention, it is important that the length of the lactone block should be kept at a minimum, however, too short a length gives rise to incompatibility between the lactone-siloxane polymer and the polycarbonate and polyester resins which in turn gives rise to an excessively slow rate of reaction. While the slow reaction rate may be reconciled by increasing the amount of catalyst, this in turn has an adverse effect on the properties of the final product. Best results were obtained in instances where the dimethyl siloxane block length is of about 50 to 80 repeating units and the caprolactone block has about 8 to 12 repeating units.

In preparing the copolymer of the invention, it is important that the amount of siloxane in the final product will be about 0.05 to 30, preferably 0.1 to 20 and most preferably about 1 to 10 percent relative to the weight of the copolymer.

In the process of the invention, the amount of catalyst used in the course of the melt blending is about 5 to 1000 ppm, preferably 25 to 500 ppm and most preferably 50 to 200 ppm, based on the weight of the resulting copolymer.

Suitable catalysts are the known transesterification catalysts which are stable at temperatures above 200° C., including the titanium, tin, zinc, antimony and lead compounds which are known in the art for their catalytic effect. Special mention would be made of titanium (IV) butoxide, tetrakis (2-ethylhexyl)titanate, tin(IV) oxide, dibutyl tin oxide, dioctyltin oxide, dibutyl tin dilaurate, dioctyltin dilaurate, butyltin hydroxide oxide, octyltin hydroxide, zinc(IV) oxide, zinc (II) oxide, lead phenolate and lead acetate.

Forming the composition of the invention may be accomplished by any conventional melt blending technique, including a thermoplastic extruder, preferably a twin screw extruder, where the reactants are heated to a melt temperature and thoroughly mixed in the presence of a catalyst to effect a reaction.

In carrying out the preparation of the copolymer of the invention the polycarbonate and polyester resins are introduced into an extruder, preferably a twin screw extruder, and the lactone-siloxane copolymer is either mixed with these resins and introduced via the feeder or melted and pumped with a suitable pump, preferably a gear pump, to a down stream adition port of the extruder. The catalyst may be added either (i) together with the polycarbonate/polyester resins in the feeder or (ii) dispersed into the melted lactone-siloxane copolymer and pumped into the extruder or (iii) dissolved in a suitable solvent, for instance, methylene chloride, chloroform and tetrachloroethane, mixed with the lactone-siloxane copolymer and then pumped into the extruder. The extrusion and pelletizing are carried out following known methods; a vacuum of about 20 to 25 inches of water was applied during the extrusion step. The extrusion process parameters, measured on a ZSK-30 twin screw extruder, are normally as follows: melt temperature 200° to 350° C., preferably 250° to 320° C., screw speed 5 to 700 rpm, preferably 100 to 600 rpm, most preferably 300 to 500 rpm.

The invention is further illustrated but is not intended to be limited by the following examples in which all parts and percentages are by weight unless otherwise specified.

EXAMPLES

Experimental:

Compositions in accordance with the invention were prepared and their properties evaluated. The resinous components in the first series of tests (Table 1) were as follows:

POLYCARBONATE—Makrolon 3200 resin, a bisphenol-A based homopolycarbonate having a melt flow rate of 4 g/10 minutes (ASTM D-1238) a product of Bayer Corporation;

POLYESTER—Tenite 12270, polyethyleneterephthalate, intrinsic viscosity of 0.7;

LACTONE—Lactone-siloxane-lactone—Tegomer H-Si 6720, a product of Goldschmidt, having a central PDMS block length of about 70 repeat units and PCL block length of about 10 repeat units.

The resinous components together with the indicated amount of dibutyltin catalyst were compounded in a twin screw extruder, pelletized and then injection molded (4 oz. Newberry) to produce the test specimens using conventional procedures.

Corresponding experiments where catalyst was not included, yielded heavily delaminated compositions.

TABLE 1

| Example | 1 | 2 | 3 | 4 | 5 |
|---|---|---|---|---|---|
| polycarbonate, % | 70 | 68 | 66 | 66 | 0 |
| polyester, % | 30 | 29 | 28 | 28 | 97 |
| lactone -siloxane block copolymer, % | 0 | 3 | 6 | 3 | 3 |
| catalyst, ppm | 0 | 75 | 150 | 150 | 150 |
| MFR (265° C. /5000 g), g/10 min. | 30 | 33 | 42 | 31 | n.d |
| Properties | | | | | |
| tensile strength @ yield, Ksi | 13.7 | 13.1 | 12.5 | 13.2 | 12.7 |
| tensile elongation @ break, % | 93 | 56 | 48 | 118 | 30 |
| impact strength, 1/4" notched Izod, ft.lb/in | 1.4 | 16.7 | 9.9 | 19.4 | 0.7 | n.d = not determined

The test specimens all had good surface appearance and exhibited no delaminations.

In a second set of experiments (Table 2), the polyester resin was Ektar DN001, a copolyester of cyclohexane dimethanol and ethylene glycol, characterized in that its viscosity is 1.0.

TABLE 2

| Example | 6 | 7 | 8 | 9 |
|---|---|---|---|---|
| polycarbonate, % | 0 | 68 | 66 | 70 |
| polyester, % | 97 | 29 | 28 | 30 |
| lactone -siloxane block copolymer, % | 3 | 3 | 6 | 0 |
| catalyst, ppm | 150 | 150 | 150 | 0 |
| MFR (265° C. /5000 g), g/10 min. | 144 | 33 | 35 | 27 |
| Properties | | | | |
| tensile strength @ yield, Ksi | 5.4 | 12.5 | 12.0 | 13.7 |
| tensile elongation @ break, % | 29 | 128 | 134 | 68 |
| impact strength, 1/4" notched Izod, ft.lb/in | 2.4 | 15.7 | 15.4 | 1.5 |

The test specimens all had good surface appearance and exhibited no delaminations.

The copolymers prepared in accordance with the present invention were characterized by means of, e.g., NMR-Spectroscopy and size exclusion chromatography equipped with FT-IR detector. In the course of the work leading up to the present invention, comparative experiments were conducted in much the same way as above except that no catalysts were added. In all these comparative experiments, the extruded material was inhomogeneous due to incomplete reaction. Attempts to injection mold the material failed.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising a copolymeric resin the structure of which comprises (i) units of the formula

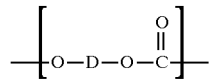

wherein D is a divalent residue of a dihydroxy compound, and (ii) units of the formula

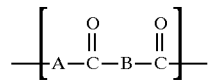

wherein A is a residue of an aliphatic glycol and B is a residue of an aromatic, aliphatic or alicyclic acid, and (iii) units of the formula

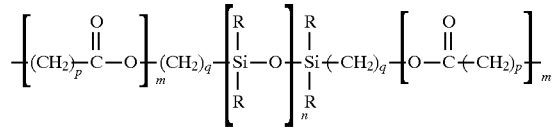

wherein m is 1 to 90, n is 5 to 300, R is an alkyl or a phenyl radical, p is 2 to 12 and q is 2 to 20.

2. The thermoplastic composition of claim 1 wherein said n is about 10 to 160.

3. The thermoplastic composition of claim 1 wherein said R is a methyl group.

4. The thermoplastic composition of claim 1 wherein said p is 2, 4 or 5.

5. The thermoplastic composition of claim 1 wherein said q is 6 to 10.

6. A process for preparing a copolycarbonate comprising reacting in the presence of a transesterification catalyst (i) a polycarbonate resin, (ii) a thermoplastic (co)polyester,
   and (ii) a lactone-siloxane block copolymer conforming to

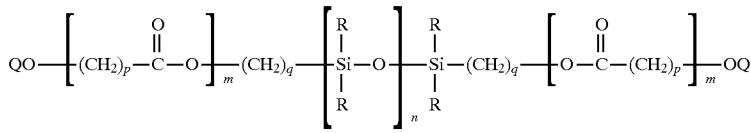

wherein
m is 1 to 90, n is 5 to 300, R denotes substituted or an unsubstituted $C_1$–$C_{20}$-alkyl or a phenyl radical, Q denotes hydrogen atom or member selected from the group consisting of $C_1$–$C_4$-alkyl group, hydrocyclic group, aromatic group, benzylic group and silyl group, p is 2 to 12, and q is 2 to 20.

7. The process of claim 6 wherein said group is substituted.

8. The process of claim 6 wherein said R denotes $C_{1-20}$-alkyl, m is 1 to 50, n is 10 to 160, Q denotes H, p is 2, 4 or 5 and q is 6 to 10.

9. The process of claim 6 wherein said catalyst is a member selected from the group consisting of titanium (IV) butoxide, tetrakis(2-ethylhexyl)titanate, tin(IV) oxide, dibutyl tin oxide, dioctyltin oxide, dibutyl tin dilaurate, dioctyltin dilaurate, butyltin hydroxide oxide, octyltin hydroxide, zinc (IV) oxide, zinc (II) oxide, lead phenolate and lead acetate.

10. The thermoplastic composition of claim 1 wherein said D is a residue of a dihydroxy compound selected from compounds conforming to formulae (1) or (2)

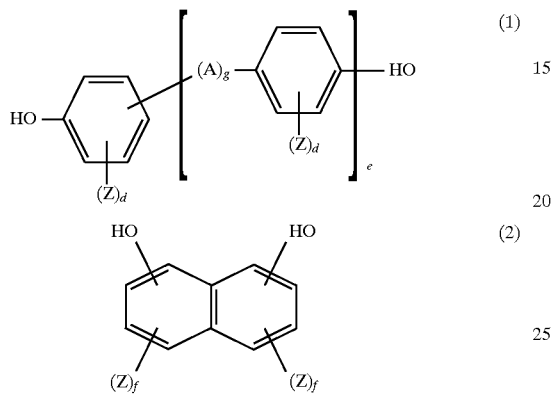

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

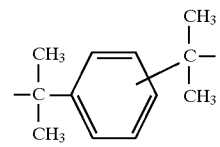

e and g both denote the number 0 to 1;

Z denotes F, Cl, Br or $C_1$–$C_4$-alkyl and if several Z radicals are substituents in one aryl radical, they are independent one of the others;

d denotes an integer of from 0 to 4; and f denotes an integer of from 0 to 3.

* * * * *